Patented Dec. 14, 1948

2,456,577

UNITED STATES PATENT OFFICE 2,456,577

PROCESS OF STABILIZING INORGANIC OXIDE GELS AGAINST WETTING

Ernest A. Bodkin, Mickleton, and John W. Payne, Woodbury, N. J., assignors to Socony-Vacuum Oil Company, Incorporated, a corporation of New York No Drawing. Application October 23, 1945, Serial No. 624,096

14 Claims. (Cl. 252—254)

1

This invention relates to a method for stabilizing dry inorganic oxide gels when the same are brought into contact with aqueous liquids. More particularly, the invention relates to a novel process in which the shattering of dry gel particles upon wetting is overcome by treatment, prior to subjection of the gel to an aqueous wetting liquid, with a water miscible organic liquid in which air is soluble to a greater extent than in water.

The high affinity of inorganic oxide gels for various fluids has long been recognized and this characteristic has in fact led to one of the principal uses of such gels, namely, as adsorbents. However, when the dry gels are immersed in aqueous wetting liquids such as water or water solutions of inorganic compounds, the gel particles tend to disrupt with violence, yielding a mass of small shattered fragments.

In certain operations employing gels, it is oftentimes expedient to immerse the dry gel in aqueous liquids without causing a shattering of the same into small fragments. For example, in the use of gel particles in various adsorbent processes or in catalytic reactions promoting the conversion of hydrocarbons, it is sometimes necessary to wet the dry gel particles without substantially modifying the shape or size of such particles, such as is caused by shattering due to wetting. To take a specific example, inorganic oxide gel particles of spheroidal shape have the advantages of packing in a uniform manner in operations in which a contact bed is employed as in the catalytic cracking of heavy hydrocarbons to lighter material of the nature of gasoline. It is accordingly desirable to retain the spheroidal shape of the formed gel when the dry particles are subjected in various processing steps to aqueous wetting liquids. Likewise in other processes dry gel particles of particular shape or even irregularly shaped fragments should suitably retain their original form when immersed in aqueous liquids which penetrate into the pores of the gel.

Attempts have been made in the past to overcome the difficulties arising by the shattering of dry gel particles when they are subjected to wetting. Some degree of success has been accomplished by placing the particles under a vacuum of less than 0.1 mm. of mercury and then immersing the particle into a desired aqueous liquid without a release of the vacuum. However, because of the high vacuum requirement, this method has not been considered to be particularly satisfactory and even when conducted on a small scale it requires a relatively difficult operating technique.

In accordance with the present invention, a

2 novel method of preventing the shattering of dry gels has now been found. This method comprises saturating the dry gel with a water miscible organic liquid having a relatively high solubility for air prior to subjecting the gel to the aqueous wetting liquid. Thus, the dry gel particles may be soaked in a water miscible organic liquid for a period of time sufficient to become saturated. This soaking period may vary from a few minutes to several hours depending on the particular organic liquid employed. Water miscible alcohols and ketones have been found to be particularly effective liquids, requiring a relatively short soaking period. After the air contained in the gel pores has thus been replaced by organic liquid, the gel is then immersed in an aqueous wetting liquid without any accompanying shattering or breaking.

The following examples will serve to illustrate the invention without limiting the same.

Example 1

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil whose depth was eight feet. The globules of solution fell through the oil and gelled before passing into a layer of water located beneath the oil. The time of gelation for the concentrations and proportions of reactants given above was about 4 seconds. The spherical particles of gel were conducted out of the bottom of the column into a stream of water and on removal from the water base exchanged with an aqueous solution of aluminum sulfate and water washed. The pellets were then slowly and uniformly dried in superheated steam at about 300° F. until shrinkage was substantially complete and the drying was continued at a gradually increasing temperature up to 1300° F. at which temperature it was maintained for ten hours. The silica-alumina gel retained its spheroidal shape during the washing and drying operations.

A sample of the dry spheroidal gel pellets was soaked in 95 per cent ethyl alcohol until the gel was saturated with liquid. Saturation of the gel with ethyl alcohol may be ascertained by visual observation, and was complete in about 15 minutes. After this treatment, the pellets were brought into contact with acqueous solution containing 25 per cent by weight sodium hydroxide and completely soaked at room temperature. Subsequent examination showed that the yield of unbroken pellets was 100%.

A second sample of the dry spheroidal gel pellets was soaked in an aqueous solution containing 25 per cent by weight sodium hydroxide. The yield of unbroken pellets in this instance was nil indicating that the soaking pretreatment of the dry gel particles with ethyl alcohol has eliminated shattering of the gel upon wetting.

Example II

A sample of dry gel pellets prepared according to Example I was soaked in tertiary butyl alcohol for about 10 minutes until the gel was saturated with liquid. After soaking, the pellets were brought into contact with water and completely soaked. Subsequent examination showed that none of the gel pellets were broken. In a similar experiment omitting pretreatment with tertiary butyl alcohol and bringing the pellets directly into contact with water all of the gel pellets were broken, indicating that the pre-soaking treatment is essential if shattering of the gel particle upon wetting is to be overcome.

Example III

A sample of dry gel pellets prepared according to Example I was soaked in acetone for about 5 minutes until the gel was saturated with liquid. After soaking, the pellets were brought into contact with water and completely soaked. Subsequent examination showed that none of the gel pellets were broken.

Example IV

A sample of dry gel pellets prepared according to Example I was soaked in glycerine for about 24 hours until the gel was saturated with liquid. The pellets were then brought into contact with water and completely soaked. Subsequent examination showed that none of the gel pellets were broken.

Example V

A sample of dry gel pellets prepared according to Example I was soaked in carbon tetrachloride for about 5 minutes until the gel was saturated with liquid. The pellets were then brought into contact with water and completely soaked. Subsequent examination showed that all of the gel pellets were broken indicating that a water miscible liquid must be used in the presoaking treatment if shattering of the gel upon wetting is to be eliminated. In this experiment, carbon tetrachloride being immiscible with water failed to give the desirable results obtained when water miscible liquids were employed.

From the above examples it will be apparent to those skilled in the art that by treating the dry gel with an organic liquid which is miscible with water and in which air is soluble to a greater extent than in water, the shattering of the gel upon contact with an aqueous wetting liquid has been overcome. Thus, if it is desired to wet a dry gel with an aqueous liquid such as water or dilute aqueous solutions, suitable pretreating organic liquids include the aliphatic alcohols such as ethyl, tertiary butyl, propyl, and the like, trihydric alcohols such as glycerine; ketones such as acetone and in general any of the water miscible organic liquids having a relatively high solubility for air, that is, those solvents in which air is substantially more soluble than in water. Thus, organic liquids in which air is at least about three times more soluble than in water have been found to be effective pretreating liquids. The present invention is thus confined to treatment of the dry gel prior to wetting with organic liquids which are water miscible and in which the gas contained in the gel pores is relatively soluble.

While the invention has been illustrated with spheroidal pellets of silica-alumina gel, other dry inorganic oxide gels of any specified shape may be treated by the process described above to render them stable when they are subjected to a wetting liquid. Thus, the present invention contemplates stabilization against disruption upon wetting of dry gels of silica, silica-stannic oxide, silica-ceria, silica-thoria, silica - alumina - thoria, silica - alumina-stannic oxide, silica-alumina-ceria and the like.

The time of pre-soaking treatment in organic liquid does not appear to be critical, it being only necessary that the gel particle be substantially saturated with the liquid before wetting. The organic liquid employed should be relatively free from water since it has been found that the percentage of silica-alumina gel particles of the type described above which are broken upon immersion in the pretreating liquid is substantially in direct proportion to the amount of water present in the preliminary treating solution. Thus, it has been established that soaking silica-alumina gel pellets in 50 per cent aqueous ethyl alcohol resulted in about 60 per cent breakage of the gel particles, while no breakage occurred when 95 per cent ethyl alcohol was used as shown in Example I.

According to the most widely accepted theory of gel structure, the water normally present in the freshly formed gel is held by capillary action. As the gel dries, the water in the capillary gel structure is replaced by air. While the present invention is, of course, not limited by any theory it is believed that the disruption of the dry gel particles upon wetting with an aqueous liquid is due to the compression of the air in the gel pores by the rapid infiltration of an aqueous liquid to increase the internal pressure to such a point that the gel particles flies apart in a violent manner. When the air normally present is replaced as in the instant invention with a water miscible organic liquid in which the entrained air is more soluble than in water, disruption of the gel does not occur since the aqueous liquid which enters the pores is miscible with the organic liquid with which the gel is saturated. Likewise, the organic liquid must be one in which air dissolves fairly readily in order that it does not of itself cause breakage of the gel. Thus, it is thought that there is substantially no internal pressure developed within the gel when it is immersed in an organic liquid of the type described and hence no disruption of the gel occurs when it is subsequently subjected to an aqueous wetting liquid.

It is to be clearly understood that the above described preliminary treatment and subsequent wetting with an aqueous liquid applies to the dry formed gel and does not include any organic liquid treatment involved in the preparation of such gels or in the treatment of wet or partially processed moist gels.

We claim:

1. A method of stabilizing a dry inorganic oxide gel against disruption upon wetting with an aqueous liquid, comprising effecting a substantial saturation of the gel under ordinary temperature conditions with a water-miscible, substantially water-free organic liquid, in which the gas contained in the pores of said gel is soluble to a greater extent than in water, and maintaining said substantial saturation of the gel until contact thereof with said aqueous liquid.

2. A method of stabilizing a dry inorganic oxide gel against disruption upon wetting with an aqueous liquid, comprising effecting a substantial saturation of the gel under ordinary temperature conditions with a water-miscible, substantially water-free organic liquid, in which air is soluble to a greater extent than in water, and maintaining said substantial saturation of the gel until contact thereof with said aqueous liquid.

3. A method of stabilizing a dry inorganic oxide gel against disruption upon wetting with an aqueous liquid, comprising effecting a substantial saturation of the gel under ordinary temperature conditions with a water-miscible, substantially water-free alcohol, in which air is soluble to a greater extent than in water, and maintaining said substantial saturation of the gel until contact thereof with said aqueous liquid.

4. A method of stabilizing a dry inorganic oxide gel against disruption upon wetting with an aqueous liquid, comprising effecting a substantial saturation of the gel under ordinary temperature conditions with a water-miscible, substantially water-free ketone, in which air is soluble to a greater extent than in water, and maintaining said substantial saturation of the gel until contact thereof with said aqueous liquid.

5. A method of stabilizing a dry inorganic oxide gel against disruption upon wetting with an aqueous liquid, comprising effecting a substantial saturation of the gel under ordinary temperature conditions with substantially water-free ethyl alcohol and maintaining said substantial saturation of the gel until contact thereof with said aqueous liquid.

6. A method of stabilizing a dry inorganic oxide gel against disruption upon wetting with an aqueous liquid, comprising effecting a substantial saturation of the gel under ordinary temperature conditions with substantially water-free tertiary butyl alcohol and maintaining said substantial saturation of the gel until contact thereof with said aqueous liquid.

7. A method of stabilizing a dry inorganic oxide gel against disruption upon wetting with an aqueous liquid, comprising effecting a substantial saturation of the gel under ordinary temperature conditions with substantially water-free acetone and maintaining said substantial saturation of the gel until contact thereof with said aqueous liquid.

8. A method of stabilizing a dry siliceous gel against disruption upon wetting with an aqueous liquid, comprising effecting a substantial saturation of the gel under ordinary temperature conditions with a water-miscible, substantially water-free organic liquid, in which air is soluble to a greater extent than in water, and maintaining said substantial saturation of the gel until contact thereof with said aqueous liquid.

9. A method of stabilizing a dry silica-alumina gel against disruption upon wetting with an aqueous liquid, comprising effecting a substantial saturation of the gel under ordinary temperature conditions with a water-miscible, substantially water-free organic liquid, in which air is soluble to a greater extent than in water, and maintaining said substantial saturation of the gel until contact thereof with said aqueous liquid.

10. A method of stabilizing dry spheroidal particles of an inorganic oxide gel against disruption upon wetting with an aqueous liquid, comprising effecting a substantial saturation of the gel under ordinary temperature conditions with a water-miscible, substantially water-free organic liquid, in which air is soluble to a greater extent than in water, and maintaining said substantial saturation of the gel until contact thereof with said aqueous liquid.

11. A method of stabilizing dry spheroidal particles of silica-alumina gel against disruption upon wetting with an aqueous liquid, comprising effecting a substantial saturation of the gel under ordinary temperature conditions with a water-miscible, substantially water-free organic liquid, in which air is soluble to a greater extent than in water, and maintaining said substantial saturation of the gel until contact thereof with said aqueous liquid.

12. A method of stabilizing dry spheroidal particles of silica alumina gel against disruption upon wetting with an aqueous liquid, comprising effecting a substantial saturation of the gel under ordinary temperature conditions with substantially water-free ethyl alcohol and maintaining said substantial saturation of the gel until contact thereof with said aqueous liquid.

13. A method of stabilizing dry spheroidal particles of silica alumina gel against disruption upon wetting with an aqueous liquid, comprising effecting a substantial saturation of the gel under ordinary temperature conditions with substantially water-free tertiary butyl alcohol and maintaining said substantial saturation of the gel until contact thereof with said aqueous liquid.

14. A method of stabilizing dry spheroidal particles of silica alumina gel against disruption upon wetting with an aqueous liquid, comprising effecting a substantial saturation of the gel under ordinary temperature conditions with substantially water-free acetone and maintaining said substantial saturation of the gel until contact thereof with said aqueous liquid.

ERNEST A. BODKIN.
JOHN W. PAYNE.

REFERENCES CITED

The following references are of record in the file of this patent:

UNITED STATES PATENTS

| Number | Name | Date |
|---|---|---|
| 1,798,766 | Stoewener | Mar. 31, 1931 |
| 1,935,178 | Connolly | Nov. 14, 1933 |
| 2,085,129 | Stoewener | June 29, 1937 |

FOREIGN PATENTS

| Number | Country | Date |
|---|---|---|
| 212,035 | Great Britain | Mar. 6, 1924 |
| 386,760 | Germany | Jan. 4, 1922 |